(12) United States Patent
Baker

(10) Patent No.: US 9,267,634 B2
(45) Date of Patent: Feb. 23, 2016

(54) WRAP-AROUND IRRIGATION TUBE PATCH

(71) Applicant: Jimmie Lynn Baker, Dudley, MO (US)

(72) Inventor: Jimmie Lynn Baker, Dudley, MO (US)

( * ) Notice: Subject to any disclaimer, the term of this patent is extended or adjusted under 35 U.S.C. 154(b) by 0 days.

(21) Appl. No.: 13/896,161

(22) Filed: May 16, 2013

(65) Prior Publication Data

US 2014/0150913 A1 Jun. 5, 2014

Related U.S. Application Data

(60) Provisional application No. 61/797,080, filed on Nov. 30, 2012.

(51) Int. Cl.
*F16L 55/16* (2006.01)
*F16L 55/17* (2006.01)

(52) U.S. Cl.
CPC ...................................... *F16L 55/17* (2013.01)

(58) Field of Classification Search
USPC .................... 138/99, 110, 158, 167, 168, 169
See application file for complete search history.

(56) References Cited

U.S. PATENT DOCUMENTS

| | | | | |
|---|---|---|---|---|
| 2,520,802 A | * | 8/1950 | Hampton | F16L 55/172 138/99 |
| 2,960,561 A | * | 11/1960 | Plummer | A44B 19/16 138/128 |
| 3,233,699 A | * | 2/1966 | Plummer | F01N 13/14 138/141 |
| 3,587,657 A | | 6/1971 | Staller | |
| 3,774,850 A | | 11/1973 | Zeman | |
| 3,954,129 A | | 5/1976 | Rudell et al. | |
| 4,153,747 A | * | 5/1979 | Young et al. | 428/41.5 |
| 4,448,824 A | * | 5/1984 | Holmes | B29C 61/10 138/110 |
| 4,465,309 A | * | 8/1984 | Nimke et al. | 285/373 |
| 4,802,509 A | * | 2/1989 | Brandolf | 138/110 |
| 4,877,660 A | * | 10/1989 | Overbergh et al. | 428/34.9 |
| 4,891,256 A | | 1/1990 | Kite, III et al. | |
| 4,900,596 A | * | 2/1990 | Peacock | 428/34.5 |
| 4,985,942 A | * | 1/1991 | Shaw | E04F 11/1836 138/110 |
| 5,141,360 A | | 8/1992 | Zeman | |
| 5,292,073 A | | 3/1994 | Zeman | |
| 5,348,801 A | * | 9/1994 | Venzi et al. | 428/354 |
| 5,590,775 A | | 1/1997 | Moore | |
| 5,651,161 A | * | 7/1997 | Asta | 15/325 |
| 5,894,864 A | * | 4/1999 | Rich | F16L 55/1686 138/97 |
| 5,901,756 A | | 5/1999 | Goodrich | |
| D460,741 S | | 7/2002 | Nakamura | |
| 2004/0079431 A1 | * | 4/2004 | Kissell | F16L 59/026 138/149 |

(Continued)

FOREIGN PATENT DOCUMENTS

EP 0116392 B2 10/1993
GB 2343728 A 5/2000

OTHER PUBLICATIONS

Heat-shrinkable sleeve, Wikipedia, Feb. 25, 2013, 4 pages, http://en.wikipedia.org/wiki/Heat-shrinkable_sleeve.

(Continued)

*Primary Examiner* — James Hook

(57) ABSTRACT

The present disclosure provides an inexpensive wrap-around irrigation tube patch composed of a thin, flexible polymer film and having a closure mechanism for quickly and effectively wrapping and sealing the patch around a damaged section of irrigation tubing. In addition, the present disclosure provides a method for sealing water leaks in irrigation tubing, the method including wrapping a wrap-around irrigation tube patch around a damaged section of irrigation tubing and sealing said patch around the irrigation tubing via a closure mechanism.

20 Claims, 8 Drawing Sheets

(56) References Cited

U.S. PATENT DOCUMENTS

2008/0185307 A1  8/2008 Hecht et al.
2013/0315675 A1* 11/2013 Pajak .................... F16L 57/06
                                                         405/184

OTHER PUBLICATIONS

Delta Plastics / Polyethylene Irrigation Tubing Manufacturer, Feb. 25, 2013, 1 page, http://www.deltapl.com/.

* cited by examiner

WRAP-AROUND IRRIGATION TUBE PATCH

CROSS REFERENCE TO RELATED APPLICATIONS

This application claims the benefit of Provisional Patent Application Ser. No. 61/797,080, filed Nov. 30, 2012, which is hereby incorporated by reference in its entirety.

BACKGROUND OF THE DISCLOSURE

The present disclosure relates generally to a wrap-around irrigation tube patch for sealing or repairing damaged sections of irrigation tubing and methods for sealing or repairing damaged sections of irrigation tubing.

"Irrigation tubing" generally refers to a wide variety of physical structures that are employed to distribute water for irrigation or various related purposes. Most irrigation tubing is cylindrical tubing composed of a polymer composition having a line of peripheral holes designed to distribute water from the water source to the field. In the past, irrigation tubing has been generally composed of rigid and hard material, such as polyvinyl chloride (PVC) or aluminum. More recently, the use of material having greater flexibility has become popular. For example, most irrigation tubing is now composed of thin, flexible yet resilient material such as low density polyethylene. Flexible irrigation tubing provides many benefits compared to hard, rigid tubing used in the past, as it is more economical and labor-saving.

While the demand for flexible irrigation tubing has grown, problems have arisen due to the thin, flexible material used. For example, a common problem associated with using flexible irrigation tubing is the tendency for the tubing to become easily damaged. Any number of causes can damage the irrigation tubing, non-limiting examples of which include, animals stepping on and/or biting the irrigation tubing, farm equipment and tractors driving into and over the irrigation tubing, storm damage, including tree limbs puncturing the irrigation tubing. As a result of such damage, water leaks through the damaged section of the irrigation tubing, creating a loss in water, energy, and possibly causing crop damage.

In general, repairing damaged sections of flexible irrigation tubing requires a great deal of time and labor. For example, a common method for repairing punctures or holes in flexible irrigation tubing involves cutting the damaged section of the flexing tubing out, replacing the damaged section of flexible irrigation tubing with a new section of rigid tubing having external ridges on both ends, wrapping the open ends of the flexible irrigation tubing around the ends of the rigid tubing, and tying a wire around the outside ends of the flexible irrigation tubing that overlap with the ends and external ridges of the hard tubing. This form of irrigation tubing repair is labor intensive and requires a significant amount of time to complete.

Accordingly, there is a need in the art for a quick and inexpensive way to repair and seal damaged sections in flexible irrigation tubing. It would be advantageous if the repair material (i.e., wrap-around irrigation tube patch) could be made of the same thin, flexible material as the irrigational tubing.

BRIEF DESCRIPTION OF THE DISCLOSURE

The present disclosure is directed to a wrap-around irrigation tube patch including a flexible polymer film having a thickness of from about 0.0254 mm to about 0.254 mm and including at least a first longitudinal edge portion and a second longitudinal edge portion. In addition, the wrap-around irrigation tube patch includes a closure mechanism having a first closure member attached to the first longitudinal edge portion of the flexible polymer film and a second closure member attached to the second longitudinal edge portion of the flexible polymer film.

The present disclosure is further directed to a wrap-around irrigation tube patch including at least a first flexible polymer film having a thickness of from about 0.0254 mm to about 0.254 mm and a second flexible polymer film having a thickness of from about 0.0254 mm to about 0.254 mm, wherein the first flexible polymer film is attached to the second flexible polymer film, and wherein each of the first and second flexible polymer films includes at least a first longitudinal edge portion and a second longitudinal edge portion. In addition, the wrap-around irrigation tube patch includes a closure mechanism having a first closure member attached to the first longitudinal edge portion of the second flexible polymer film and a second closure member attached to the second longitudinal edge portion of the second flexible polymer film.

The present disclosure is further directed to a method for sealing water leaks in irrigation tubing, the method including: wrapping a wrap-around irrigation tube patch around a damaged section of irrigation tubing, wherein the patch includes a flexible polymer film, the flexible polymer film including at least a first longitudinal edge portion and a second longitudinal edge portion; and sealing the patch around the damaged section of irrigation tubing via a closure mechanism, wherein the closure mechanism includes a first closure member attached to the first longitudinal edge portion of the flexible polymer film and a second closure member attached to the second longitudinal edge portion of the flexible polymer film.

Figure 1:
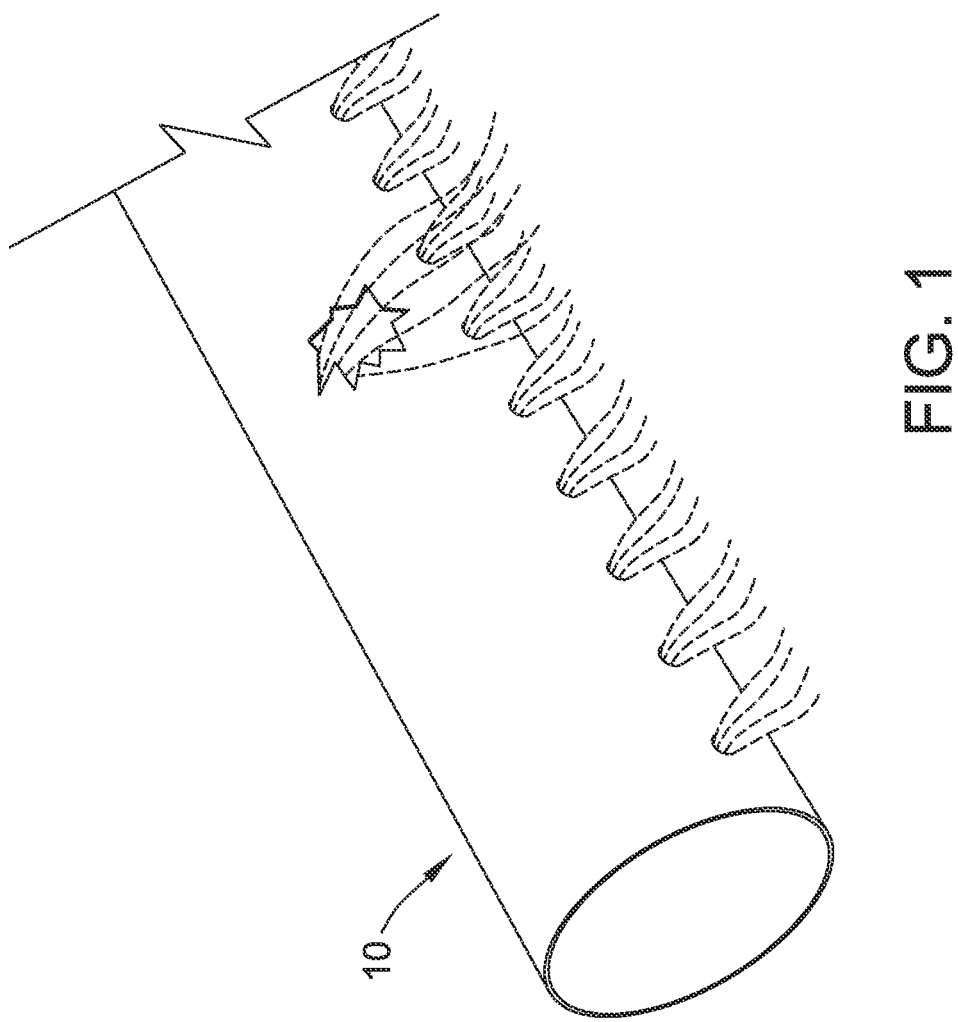
FIG. 1 depicts a damaged section of irrigation tubing or tube 10 in accordance with the present disclosure.
Figure 2:
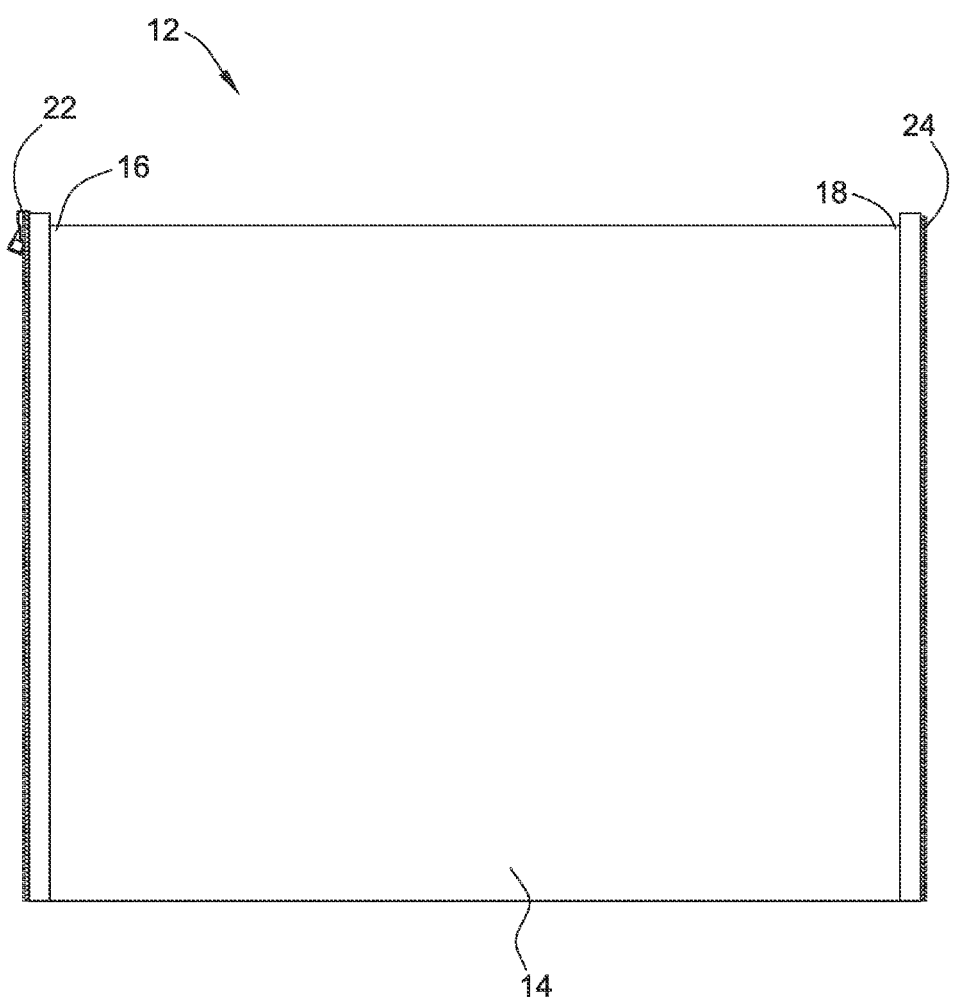
FIG. 2 depicts a top view of a wrap-around irrigation tube patch 12 in accordance with the present disclosure and laid flat prior to use.
Figure 3:
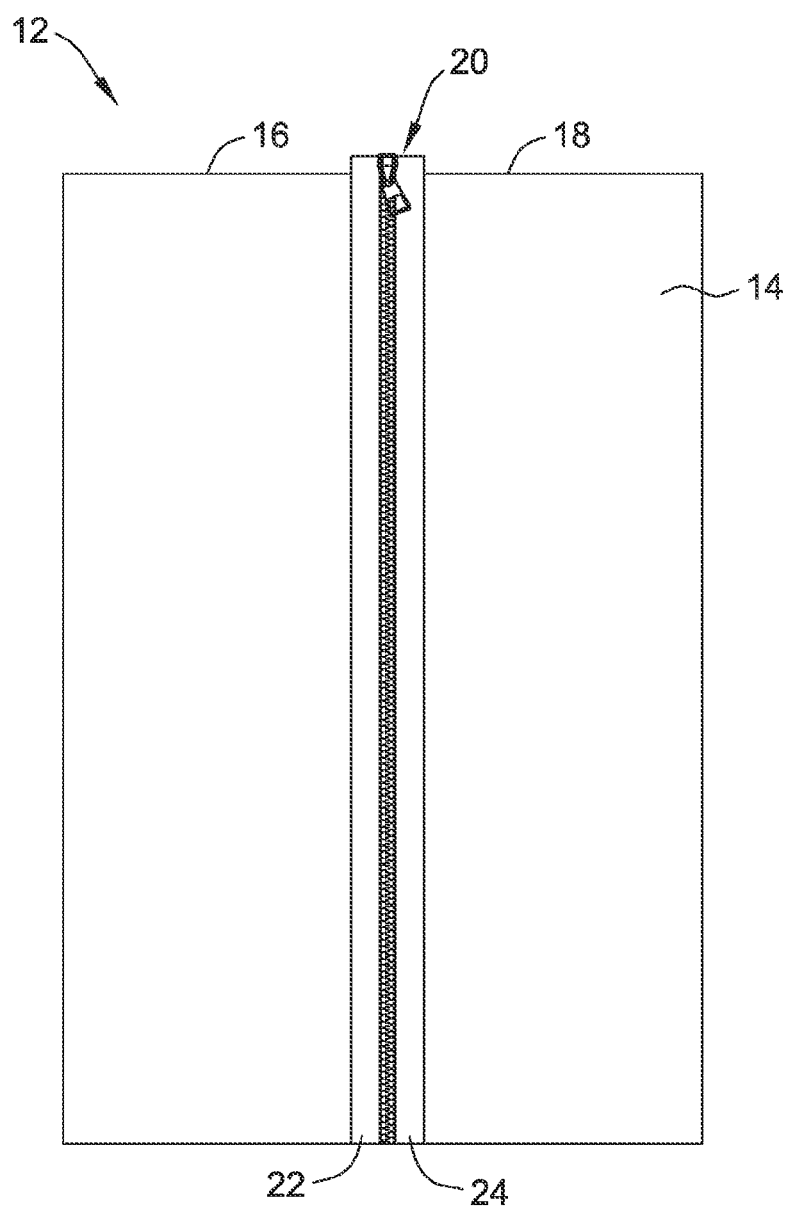
FIG. 3 depicts a top view of a wrap-around irrigation tube patch 12 in accordance with the present disclosure.
Figure 4:
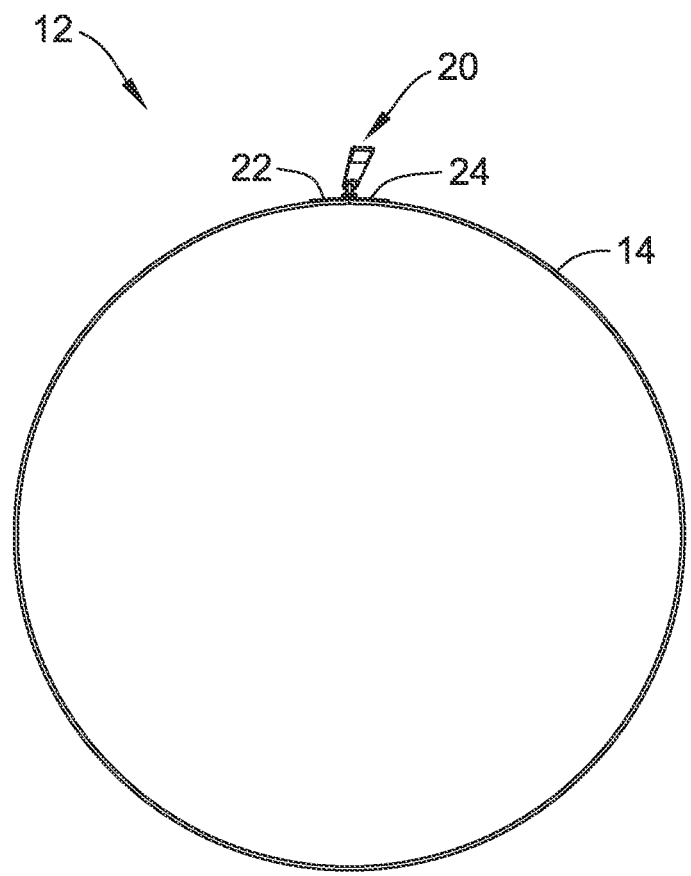
FIG. 4 depicts an end view of a wrap-around irrigation tube patch 12 in accordance with the present disclosure.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DETAILED DESCRIPTION OF THE DISCLOSURE

FIG. 1 depicts a damaged section of irrigation tubing or tube 10. In more recent years, irrigation tubing has been composed of flexible and thin, yet durable thermoplastic polymer compositions, such as compositions including polyethylene and/or polypropylene. Despite the general durability of the flexible irrigation tubing, as discussed above, damage to flexible irrigation tubing easily occurs and may result in the formation of a hole, rip, or tear in the flexible irrigation tubing. As used herein, the term "damaged section" of irrigation tubing refers to a flexible irrigation tube or tubing having a hole, puncture, tear, slit, rip, or other form of damage as a result of a force pulling apart the irrigation tube or tubing. Any number of causes or forces may damage the flexible irrigation tubing. Non-limiting examples include: animals stepping on and/or biting the irrigation tubing, farm equipment and tractors driving into and over the irrigation tubing, storm damage, including tree limbs puncturing the irrigation tubing, and the like. When the irrigation tube or tubing contains a hole or other damaged section, the damaged section of the irrigation tube or tubing will leak water through the hole or damaged section, creating a loss in water, energy, and possibly causing crop damage.

The present disclosure to directed to a wrap-around irrigation tube patch. The patch includes at least one flexible polymer film having at least a first longitudinal edge portion and a second longitudinal edge portion. The flexible polymer film of the patch is thin, having a thickness of from about 0.0254 mm to about 0.254 mm, including a thickness of from about 0.0508 mm to about 0.254 mm, further including a thickness of from about 0.1016 mm to about 0.254 mm, and further including a thickness of from about 0.1778 mm to about 0.254 mm. The flexible polymer film generally contains a thickness similar or identical to the thickness of the irrigation tube. It is believed that when the patch includes an extremely thin and flexible film that is similar or identical to the thickness of the irrigation tube, the thickness of the flexible polymer film aids in sealing the patch to the irrigation tube in the presence of water.

In addition, the wrap-around irrigation tube patch includes a closure mechanism having a first closure member attached to the first longitudinal edge portion of the flexible polymer film and a second closure member attached to the second longitudinal edge portion of the flexible polymer film.

The wrap-around irrigation tube patch is further described herein with reference to FIGS. 2-5. The patch 12 according to the present disclosure includes a polymer film 14. As used herein, the term "film" refers to a non-woven thermoplastic film made using a film extrusion and/or forming process, such as a cast film or blown film extrusion process. The film may be composed of any suitable thermoplastic film resin, suitable examples including but not limited to polyethylene, polypropylene and/or any other thermoplastic capable of forming a thin, flexible film. In particular, low density polyethylene, linear low density polyethylene, and polypropylene are suitable thermoplastic films for use in the present disclosure.

The low density polyethylene can be a plastomer or elastomer. The term "low density polyethylene" refers to a homopolymer of ethylene having a random crystalline structure and a density of from about 0.910 to about 0.940 grams per cubic centimeter. The term "linear low density polyethylene" refers to copolymers of ethylene with one or more comonomers selected from preferably $C_4$-$C_1$ alpha-olefins such as butane-1, octane, in which long chains of copolymer are formed with relatively few side chain branches or cross-linking. Linear low density polyethylene has a predominantly linear crystalline structure and a density of from about 0.916 to about 0.930 grams per cubic centimeter.

Suitable commercial sources of ethylene-based polymers are available under the designations EXACT™ and ENABLE™ from ExxonMobil Chemical Company of Houston, Tex., and ENGAGE™, VERSIFY™, and AFFINITY™ from The Dow Chemical Company of Midland, Mich. Other suitable ethylene polymers are available from The Dow Chemical Company, for example, under the designation DOWLEX™. Polyolefin films commercially available from 3M Company, Minneapolis, Minn. are also suitable for use in the present disclosure.

Further, blends of thermoplastics are suitable for use in the present disclosure, including blends of polyethylene and polypropylene. For example, in one embodiment, the flexible polymer film may comprise a blend of polyethylene and polypropylene having a ratio (by weight % of the polymeric blend) of polyethylene to polypropylene of from about 75/25 to about 25/75, including from about 70/30 to about 30/70, further including from about 60/40 to about 40/60, further including about 50/50.

In an exemplary embodiment, the patch 12 includes a flexible polymeric film composed of material that is similar or identical to the material of the irrigation tube 10. It is believed that when the patch 12 includes an extremely thin and flexible film that is similar or identical to the material of the irrigation tube 10, the similarity of the material aids in sealing the patch 12 to the irrigation tubing 10 in the presence of water.

The flexible polymer film 14 includes at least a first longitudinal edge portion 16 and a second longitudinal edge portion 18. The first longitudinal edge portion 16 and the second longitudinal edge portion 18 are joined together by a closure mechanism 20. The closure mechanism 20 includes a first closure member 22 attached to the first longitudinal edge portion of the flexible polymer film and a second closure member 24 attached to the second longitudinal edge portion of the flexible polymer film. The closure members 22 and 24 run continuously along opposing longitudinal edge portions 16 and 18 of the film 14. The closure members 22 and 24 may be attached to the longitudinal edge portions 16 and 18 of the film 14 using any conventional technique known in the art, non-limiting examples include stitching and/or use of an adhesive. Suitable adhesives for attaching polymer films include epoxy resins, cyanoacrylics, polyurethanes, silicones, phenolics, hot-melt adhesives, and other acrylics, as known in the art. Exemplary adhesives include ADH 7132K, HERBERT'S ADHESIVES, and BOSTIK MARINE 920 available from Findley-Brand Adhesives Company (Bostik), Middleton, Mass.

The closure members 22 and 24 comprise one or more of an attachment means for attaching the first longitudinal edge portion 16 to the second longitudinal edge portion 18 of the film 14. As used herein, the term "attachment means" refers to a manner/means in which the closure mechanism attaches the first longitudinal edge portion 16 to the second longitudinal edge portion 18 of the film 14. The attachment means may be selected from the group consisting of teeth, hooks, buttons, loops, clamps, Velcro (i.e., hook and loop), adhesive, and/or any other mechanical or chemical means for attaching the first longitudinal edge portion 16 to the second longitudinal edge portion 18 of the film 14 as known in the art.

In one exemplary embodiment, the closure mechanism 20 is a slide fastener, such as a plastic or steel zipper, the first closure member 22 having teeth and the second closure member 24 having a mating portion with mating teeth. In another embodiment, the closure mechanism 20 may be a hook or button fastener, the first closure member 22 having a hook or button and the second closure member 24 having a mating portion with a hole or opening for receiving a hook and/or button.

The wrap-around irrigation tube patch according to the present disclosure may be created in a number of different sizes and shapes. In general, the patch 12 may be created such that when wrapped around the irrigation tubing 10 the patch 12 contains a diameter of between 2.5 cm and 64 cm, including from about 2.5 cm to about 40 cm, including from between 10 cm and 50 cm, further including from between 20 cm and 40 cm, preferably including between 25 cm and 35 cm. Typically, the diameter of the patch 12 will be similar or identical to the diameter of the irrigation tube 10 in order to form a tight fit around the irrigation tube. For example, the diameter of the patch 12 may be 75%, 80%, 85%, 90%, 95%, 98%, 99%, or even 100% identical to the diameter of the irrigation tube 10.

When applied, the patch 12 generally includes open ends that allow the patch to be applied to damaged sections or portions of longer sections of irrigation tubing. In general, the open ends of the patch 12 will have a diameter substantially uniform to one another. In preferred embodiments, the diameter of the patch, including the open ends of the patch and the cylindrical portion of the patch between both open ends, is substantially uniform throughout. As used herein, substantially uniform is defined as being 85%, 90%, 95%, 98%, 99%, or even 100% uniform in diameter.

The patch 12 may be created in any length, such that when the patch 12 is wrapped around the irrigation tubing 10, the length of the patch 12 will typically range between 2.5 cm and 122 cm, including from between 10 cm and 100 cm, further including from between 30 cm and 80 cm, further including from between 50 cm and 70 cm.

While the film 14 of the patch 12 may be thinner or thicker than the thickness of the irrigation tubing 10, the film 14 generally will contain a thickness similar or identical to the thickness of the irrigation tubing 10. For example, the thickness of the patch 12 may be 75%, 80%, 85%, 90%, 95%, 98%, 99%, or even 100% identical to the thickness of the irrigation tube. In general, the polymer film 14 is extremely thin and has a thickness of from about 0.0254 mm to about 0.254 mm, including a thickness of from about 0.0508 mm to about 0.254 mm, further including a thickness of from about 0.1016 mm to about 0.254 mm, and preferably including a thickness of from about 0.1778 mm to about 0.254 mm.

Figure 5:
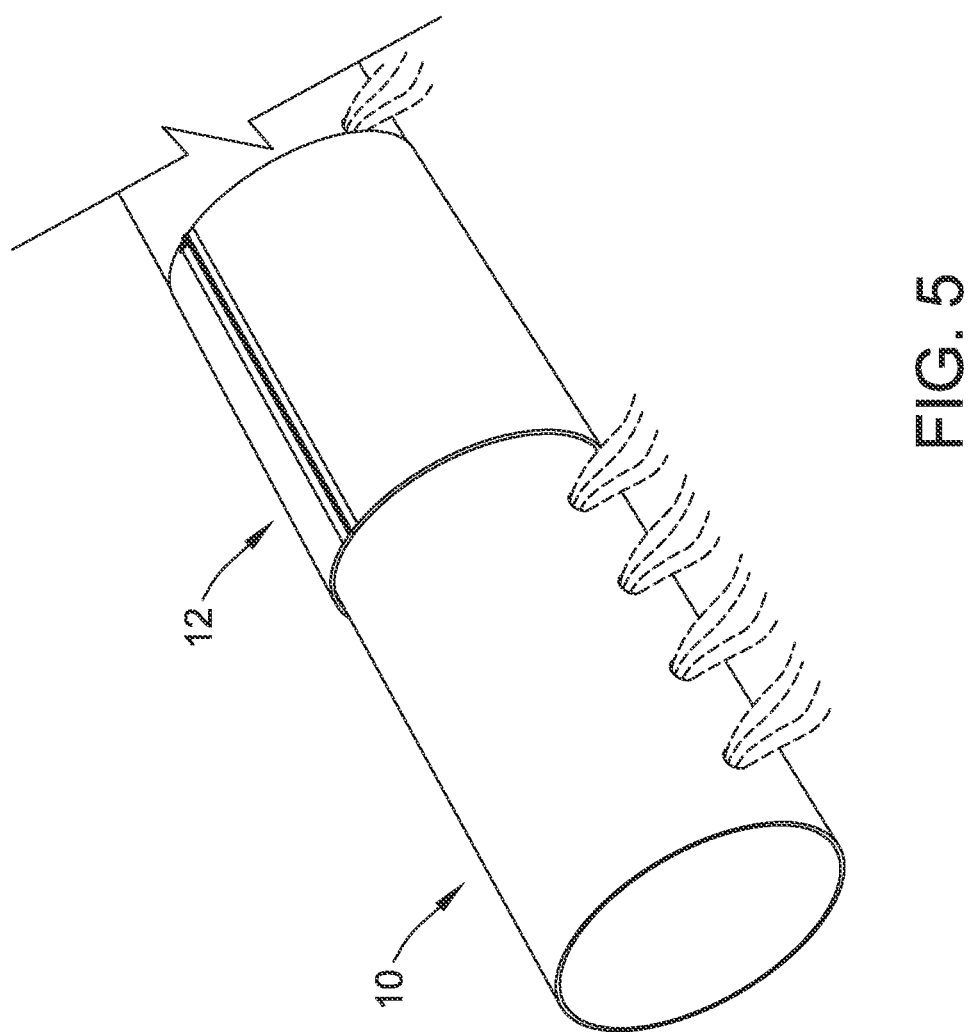
FIG. 5 depicts a wrap-around irrigation tube patch 12 in accordance with the present disclosure wrapped around a damaged section of irrigation tubing 10.

In FIG. 5 there is shown a patch 12 according to the present disclosure as applied to a damaged section of irrigation tubing 10. While FIG. 5 shows a cylindrical patch 12 composed of a single polymer film 14, the patch may be created in various shapes so long as the patch is able to form a tight fit when wrapped around the irrigation tube. In preferred embodiments, the patch forms a tight fit when wrapped/encircled completely around the irrigation tubing and the gap width existing between the patch and irrigation tube is less than 10 mm, preferably less than 5 mm, preferably less than 3 mm, even more preferably less than 1 mm. In general, the shape of the patch 12 will be cylindrical throughout when wrapped around the irrigation tube and will be similar or identical in shape to the shape of the cylindrical irrigation tube 10. However, other embodiments of the patch 12 may include designs to customize the patch 12 for wrapping and sealing around a damaged section in the irrigation tube 10.

Figure 6:
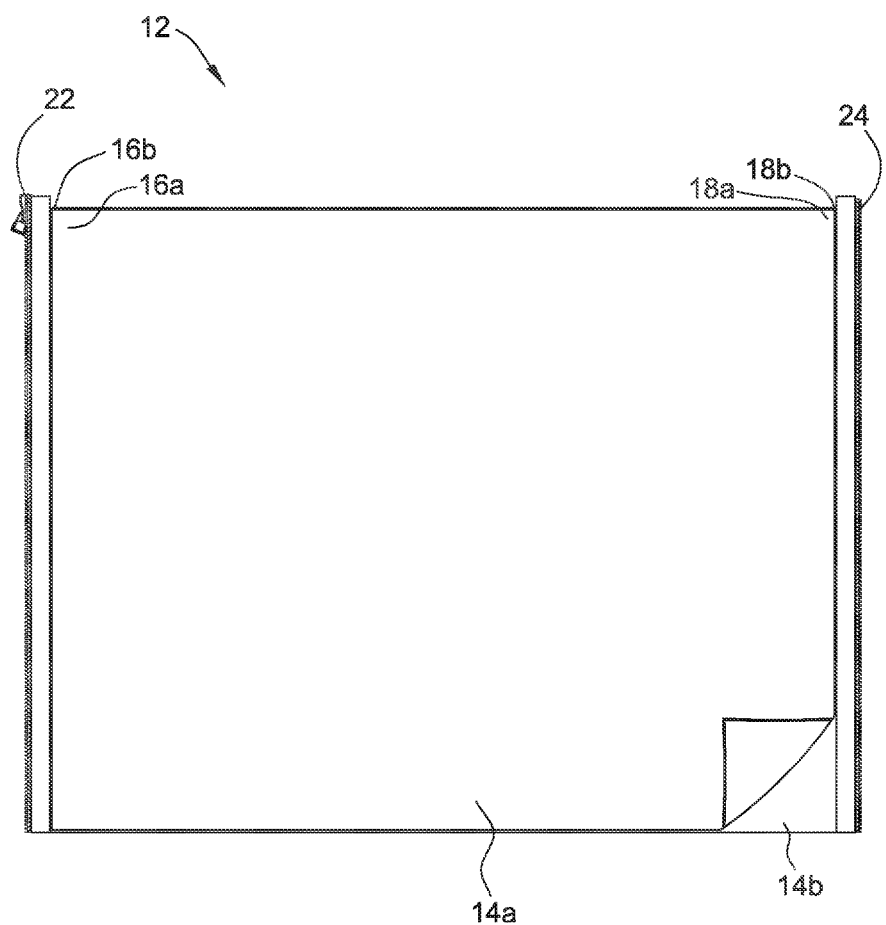
FIG. 6 depicts a wrap-around irrigation tube patch 12 in accordance with the present disclosure including multiple attached flexible polymer films and laid flat prior to use.
Figure 7:
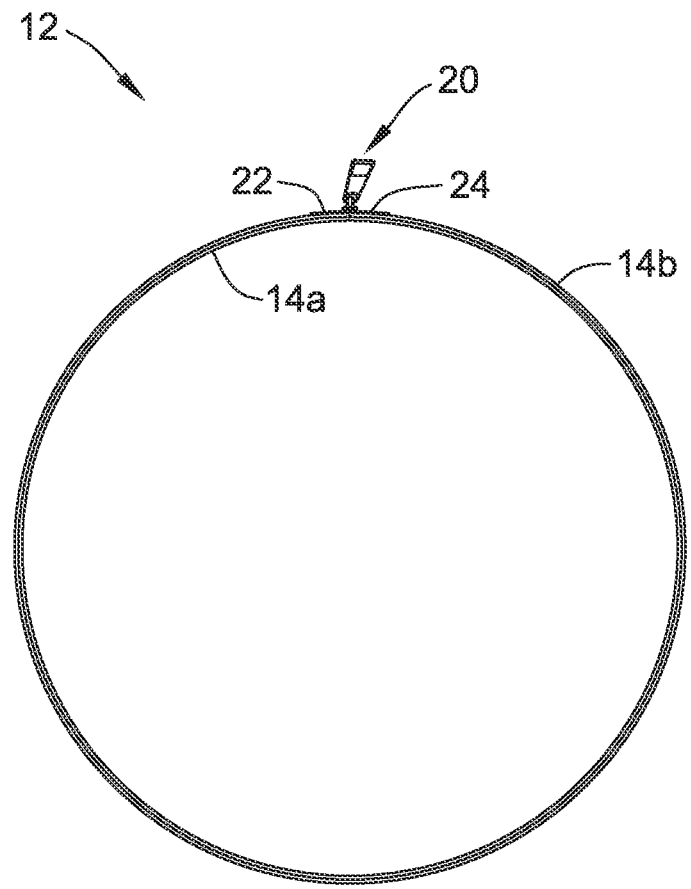
FIG. 7 depicts an end view of a wrap-around irrigation tube patch 12 in accordance with the present disclosure including multiple attached flexible polymer films.
Figure 8:
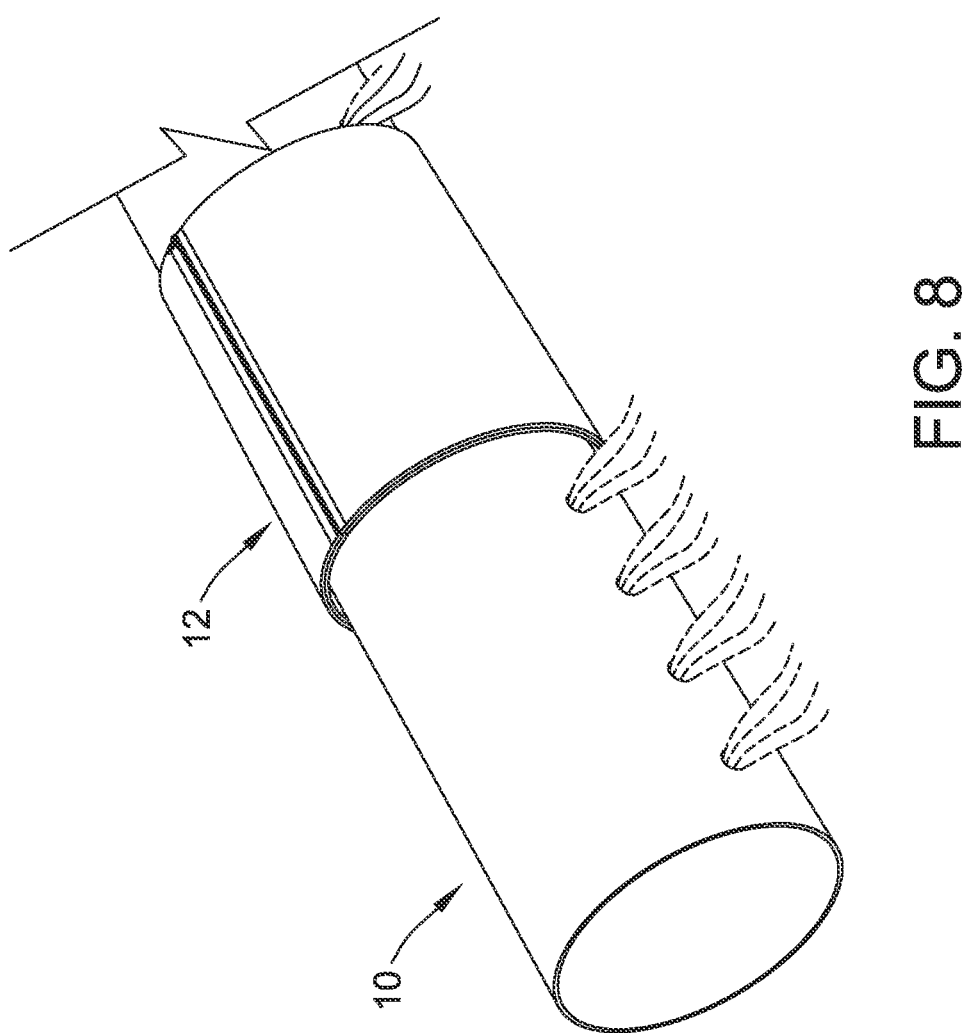
FIG. 8 depicts a wrap-around irrigation tube patch 12 in accordance with the present disclosure including multiple attached flexible polymer films and wrapped around a damaged section of irrigation tubing 10.

In addition, the patch 12 may include more than one layer of flexible polymer film 14. For example, as shown in FIGS. 6-8, the patch 12 may comprise multiple layers of flexible polymer film 14 for added protection from water leakage. In one particular embodiment, a second flexible polymer film 14b is attached to a first flexible polymer film 14a. The first flexible polymer film 14a and second flexible polymer film 14b each comprise a first and a second longitudinal edge portion 16 and 18. In one embodiment, the second flexible polymer film 14b may be attached to the first flexible polymer film 14a along the first longitudinal edge portions. For example longitudinal edge portion 16a of the first flexible polymer film and longitudinal edge portion 16b of the second flexible polymer film are attached and longitudinal edge portion 18a of the first flexible polymer film and longitudinal edge portion 18b of the second flexible polymer film are attached. The second flexible polymer film 14b may be attached to the first flexible polymer film 14a by using any suitable attachment mechanism, non-limiting examples of which include stitching flexible polymer films 14a and 14b together or applying an adhesive to a portion or the entire inner side of the second flexible polymer film 14b before attaching the second flexible polymer film 14b to the first flexible polymer film 14a. While described herein as having 2 flexible polymer films, it should be understood that more than 2 flexible polymer films may be used, such as 3, 4, 5, 6, or even more in the patch 12.

In embodiments where the patch 12 includes a first polymer film 14a attached to a second polymer film 14b, the overall patch has a thickness of between about 0.0508 mm and about 0.508 mm, including a thickness of between about 0.1016 mm and about 0.4064 mm, further including a thickness of between about 0.1523 mm and about 0.4064 mm, further including a thickness of between about 0.2032 mm and 0.4064 mm, further including a thickness of between 0.254 mm and 0.3555 mm, and further including a thickness of between about 0.3047 mm and about 0.3555 mm.

The flexible polymer film 14 includes at least a first longitudinal edge portion 16 and a second longitudinal edge portion 18. The first longitudinal edge portion 16 and the second longitudinal edge portion 18 are joined together by a closure mechanism 20. The closure mechanism 20 includes a first closure member 22 attached to the first longitudinal edge portion of the flexible polymer film and a second closure member 24 attached to the second longitudinal edge portion of the flexible polymer film. The closure members 22 and 24 may be attached to the longitudinal edge portions 16 and 18 of the film 14 using any conventional technique known in the art, non-limiting examples include stitching and/or use of an adhesive. The closure members 22 and 24 run continuously along opposing longitudinal edge portions of the film 14.

The closure members 22 and 24 comprise one or more of an attachment means for attaching the first longitudinal edge portion 16 to the second longitudinal edge portion 18 of the film 14. As used herein, the term "attachment means" refers to a manner/means in which the closure mechanism attaches the first longitudinal edge portion to the second longitudinal edge portion of the film. The attachment means may be selected from the group consisting of teeth, hooks, buttons, loops, clamps, Velcro, adhesive, and/or any other mechanical or chemical means for attaching the first longitudinal edge portion 16 to the second longitudinal edge portion 18 of the film 14 as known in the art.

In certain embodiments, various adhesives and/or sealants may be applied to the inner side of the flexible polymer film 14 or 14a for aiding adhesion between the flexible polymer film 14 or 14a and the irrigation tube 10 and/or for aiding sealing between the flexible polymer film 14 or 14a and the irrigation tube 10. In particular, adhesives and/or sealants may be applied to a portion of the inner side of the polymer film, such as 10%, 25%, 50%, 75%, or even up to 95% of the inner side of the polymer film 14 or 14*a* that will come into contact with the outer side of the irrigation tube 10 when the patch 12 is wrapped around the irrigation tube 10. Alternatively, adhesives and/or sealants may be applied to the entire inner side of the polymer film 14 or 14*a*. The adhesives and/or sealants may be applied to the polymer film 14 prior to wrapping the patch 12 around the irrigation tube 10.

Various adhesives may be used in accordance with the present disclosure to aid in adhesion of the patch 12 to the irrigation tube 10. As used herein, the term "adhesive" means a liquid or semi-liquid material that adheres or bonds items together. Adhesives are in general particularly effective for bonding thin materials such as polymers films and/or sheets. In one embodiment, an adhesive may be applied to a portion of the inner side of the polymer film, such as 10%, 25%, 50%, 75%, or even up to 95% of the inner side of the polymer film 14 or 14*a* that will come into contact with the outer side of the irrigation tube 10 when the patch 12 is wrapped around the irrigation tube 10. Alternatively, an adhesive may be applied to the entire inner side of the polymer film 14 or 14*a*. Non-limiting examples of suitable adhesives for use with the present disclosure include epoxy resins, cyanoacrylics, polyurethanes, silicones, phenolics, hot-melt adhesives, and other acrylics, as known in the art. Exemplary adhesives include ADH 7132K, HERBERT'S ADHESIVES, AND BOSTIK MARINE 920 available from Findley-Brand Adhesives Company. The adhesive used should be suitable for bonding polyolefins to polyolefins or suitable for bonding polyethylene and/or polypropylene to polyethylene and/or polypropylene, respectively. In particular, one or more polyethylene film may be adhesively bonded to a polyethylene film, one or more polyethylene film may be adhesively bonded to a polypropylene film, and/or one or more polypropylene film may be adhesively bonded to a polypropylene film. Adhesives suitable for use may include a film coating, a liquid coating, or a spray coating that is applied to at least a part of the inner side of the polymer film, such as 10%, 25%, 50%, 70%, or even up to 95% of the inner side of the polymer film. Alternatively, the adhesive film coating, liquid coating, or spray coating may be applied to the entire inner side of the polymer film.

Alternatively, the adhesive used may be provided in the form of self-adhesive tape that is applied to at least a part of the inner side of the polymer film, such as 10%, 25%, 50%, 75%, or even up to 95% of the inner side of the polymer film. Alternatively, the self-adhesive tape may be applied to the entire inner side of the polymer film prior to wrapping the patch 12 around the irrigation tube 10.

In other embodiments, various sealants may be used in accordance with the present disclosure to aid in the water sealing properties of the patch 12. As used herein, the term "sealant" refers to a substance used to seal a surface to prevent passage of a liquid or gas. The sealant may have water resistant properties and/or may have adhesive properties in addition to sealant properties. Non-limiting examples of suitable sealants for use with the present disclosure include polyethylene sealants, polyurethane sealants, silicone sealants, and other acrylic sealants. Exemplary sealants that may be used include BOSTIK MARINE 920 available from Findley-Brand Adhesives Company, as well as DOW CORNING® 7091 SEALANT available from Dow Corning Corp., Midland, Mich. The sealant used should be suitable for use with polyolefins like polyethylene and/or polypropylene. In one embodiment, a sealant may be applied to at least a part of the inner side of the polymer film, such as 10%, 25%, 50%, 75%, or even up to 95% of the inner side of the polymer film 14 or 14*a* that will come into contact with the outer side of the irrigation tube 10 when the patch 12 is wrapped around the irrigation tube 10. Alternatively, a sealant may be applied to the entire inner side of the polymer film 14 or 14*a*. Sealants used may take the form of a film coating, liquid coating, or spray coating that is applied to at least a part of the inner side of the polymer film, such as 10%, 25%, 50%, 75%, or even up to 95% of the inner side of the polymer film. Alternatively, the sealant film coating, liquid coating, or spray coating may be applied to the entire inner side of the polymer film.

Alternatively, the sealant may take the form of self-adhesive sealant tape to be applied to at least a part of the inner side of the polymer film, such as 10%, 25%, 50%, 75%, or even up to 95% of the inner side of the polymer film. Alternatively, the self-adhesive sealant tape may be applied to the entire inner side of the polymer film prior to wrapping the patch 12 around the irrigation tube 10. Butyl rubber sealing tape for example could be used for this purpose.

Also disclosed is a method for sealing water leaks in irrigation tubing. The method includes wrapping and sealing a patch around a damaged section of irrigation tubing, wherein the patch includes a flexible polymer film, the film including at least a first longitudinal edge portion and a second longitudinal edge portion. As discussed above, the flexible polymer film may be composed of any suitable thermoplastic film resin, suitable examples including but not limited to polyethylene, polypropylene and/or any other thermoplastic capable of forming a thin, flexible film. Preferably, the flexible polymer film is composed of material that is similar or identical to the material of the irrigation tube and contains a thickness similar or identical to the thickness of the irrigation tube. The flexible polymer film of the patch is thin, having a thickness of from about 0.0254 mm to about 0.254 mm, including a thickness of from about 0.0508 mm to about 0.254 mm, further including a thickness of from about 0.1016 mm to about 0.254 mm, and preferably including a thickness of from about 0.1778 mm to about 0.254 mm. It is believed that when the patch includes a flexible polymer film having a similar thickness and material composition to the irrigation tube, the similarity of the thickness and material composition aids the flexible polymer film in forming an effective seal around the irrigation tube in the presence of water.

In addition, and as discussed above, the patch may be created such that when wrapped around the irrigation tubing the patch contains a diameter of between 2.5 cm and 64 cm, including from between 10 cm and 50 cm, further including from between 20 cm and 40 cm, and further including between 25 cm and 30 cm. Typically, the diameter of the patch will be similar or identical to the diameter of the irrigation tube in order to form a tight fit around the irrigation tube. For example, the diameter of the patch may be 75%, 80%, 85%, 90%, 95%, 98%, 99%, or even 100% identical to the diameter of the irrigation tube. The patch may also be created in any length, such that when the patch is wrapped around the irrigation tubing, the length of the patch will typically range between 2.5 cm and 122 cm, including from between 10 cm and 100 cm, further including from between 30 cm and 80 cm, and further including from between 50 cm and 70 cm.

The method further includes sealing the patch to the irrigation tubing via a closure mechanism, wherein the closure mechanism includes a first closure member attached to the first longitudinal edge portion of the flexible polymer film and a second closure member attached to the second longitudinal edge portion of the flexible polymer film. As discussed above, the closure members run continuously along opposing longitudinal edge portions of the film. The closure members may be attached to the longitudinal edge portions of the flexible polymer film using any conventional technique known in the art, non-limiting examples include stitching and/or use of an adhesive. Non-limiting examples of suitable adhesives for use with the present disclosure include epoxy resins, cyanoacrylics, polyurethanes, silicones, phenolics, hot-melt adhesives, and other acrylics, as known in the art.

The closure members comprise one or more of an attachment means for attaching the first longitudinal edge portion to the second longitudinal edge portion of the flexible polymer film. The attachment means may be selected from the group consisting of teeth, hooks, buttons, loops, clamps, Velcro, adhesive, and/or any other mechanical or chemical means for attaching the first longitudinal edge portion to the second longitudinal edge portion of the film as known in the art. In one embodiment, the closure mechanism is a slide fastener, such as a plastic or steel zipper, the first closure member having teeth and the second closure member having a mating portion with mating teeth. In another embodiment, the closure mechanism may be a hook or button fastener, the first closure member having a hook or button and the second closure member having a mating portion with a hole or opening for receiving a hook and/or button.

To apply the wrap-around irrigation tube patch according to the present disclosure, a user wraps either the first or second longitudinal edge portion of the film around the outside of the damaged section of the irrigation tube. As used herein, "damaged section" of irrigation tubing refers to any section of the irrigation tubing having a puncture, tear, rip, split, crack or hole as a result of it having been forcefully pulled apart. The patch is wrapped/encircled completely around the irrigation tubing until the user can seal the patch to the irrigation tube by utilizing the closure mechanism. As discussed above, the closure members of the closure mechanism comprise at least one of an attachment means selected from the group consisting of teeth, hooks, buttons, loops, clamps, Velcro, adhesive, and/or any other mechanical or chemical means as known in the art. In one particularly preferred embodiment, a user may utilize a slide fastener closure mechanism to seal the patch to the irrigation tube by joining together a first and second closure member of said patch, the first closure member comprising mating teeth and the second closure member comprising a mating portion.

When the patch is wrapped around the damaged section of the irrigation tube, and the closure mechanism is employed, the patch forms a tight and secure fit around the damaged section of the irrigation tube, effectively creating a seal to prevent water loss. As discussed above, the diameter of the patch will be similar or identical to the diameter of the irrigation tube in order to form a tight fit around the irrigation tube. For example, the diameter of the patch may be 75%, 80%, 85%, 90%, 95%, 98%, 99%, or even 100% identical to the diameter of the irrigation tube. In particular, where the patch is wrapped/encircled completely around the irrigation tubing, a gap width between the patch and irrigation tube should be less than 10 mm, preferably less than 5 mm, preferably less than 3 mm, and even more preferably less than 1 mm. It is believed that the combination of the patch having a similar or identical diameter to the irrigation tube and the similarity of the flexible polymer film composition and thickness relative to the irrigation tube allows the patch to form a tight and secure seal around the irrigation tube in the presence of water.

When introducing elements of the present disclosure or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A flexible wrap-around irrigation tube patch, the patch comprising:
    a flexible polymer film having a thickness of from about 0.0254 mm to about 0.254 mm and including at least a first longitudinal edge portion and a second longitudinal edge portion; and
    a closure mechanism comprising a slide fastener, the closure mechanism having a first closure member attached to the first longitudinal edge portion of the flexible polymer film and a second closure member attached to the second longitudinal edge portion of the flexible polymer film,
    wherein the flexible polymer film is made by a process consisting essentially of film extrusion and/or film forming,
    wherein the flexible wrap-around irrigation tube patch has a substantially uniform diameter of from about 2.5 cm to about 40 cm, and
    wherein the flexible wrap-around irrigation patch is applied to flexible irrigation tubing and wherein the diameter of the applied flexible wrap-around irrigation patch is from 75% to 99% of the diameter of the flexible irrigation tubing.

2. The wrap-around irrigation tube patch as set forth in claim 1 wherein the flexible polymer film comprises a thermoplastic polyolefin.

3. The wrap-around irrigation tube patch as set forth in claim 1 wherein the closure mechanism is a zipper.

4. The wrap-around irrigation tube patch as set forth in claim 1 wherein the patch has a diameter of from about 20 cm to about 40 cm.

5. The wrap-around irrigation tube patch as set forth in claim 1 wherein the polymer film comprises an adhesive coating applied at least partially to the inner side of the polymer film.

6. The wrap-around irrigation tube patch as set forth in claim 1 wherein the polymer film comprises a sealant coating applied at least partially to the inner side of the polymer film.

7. The wrap-around irrigation tube patch as set forth in claim 1 wherein the diameter of the applied flexible wrap-around irrigation patch is from 75% to 95% of the diameter of the flexible irrigation tubing.

8. A flexible wrap-around irrigation tube patch, the patch comprising:
    at least a first flexible polymer film having a thickness of from about 0.0254 mm to about 0.254 mm and a second flexible polymer film having a thickness of from about 0.0254 mm to about 0.254 mm, wherein the first flexible polymer film is attached to the second flexible polymer film, and wherein each of the first and second flexible polymer films comprises at least a first longitudinal edge portion and a second longitudinal edge portion; and
    a closure mechanism having a first closure member attached to the first longitudinal edge portion of the second flexible polymer film and a second closure member attached to the second longitudinal edge portion of the second flexible polymer film;
    wherein the closed flexible wrap-around irrigation tube patch has a diameter of from about 2.5 cm to about 40 cm and wherein the diameter is from 98% to 100% uniform in diameter.

9. The wrap-around irrigation tube patch as set forth in claim 8 wherein the second flexible polymer film is attached to the first flexible polymer film along the first longitudinal edge portion of the first flexible polymer film and the second longitudinal edge portion of the first flexible polymer film.

10. The wrap-around irrigation tube patch as set forth in claim 9 wherein the second flexible polymer film is attached to the first flexible polymer film via an adhesive.

11. The wrap-around irrigation tube patch as set forth in claim 8 wherein the flexible polymer film comprises a thermoplastic polyolefin.

12. The wrap-around irrigation tube patch as set forth in claim 8 wherein at least one of the first and second closure members comprises one or more of an attachment means selected from the group consisting of teeth, hooks, loops, buttons, clamps, hook and loop, and adhesive.

13. The wrap-around irrigation tube patch as set forth in claim 8 wherein the closure mechanism comprises a slide fastener.

14. The wrap-around irrigation tube patch as set forth in claim 8 wherein the patch has a diameter of from about 20 cm to about 40 cm.

15. The wrap-around irrigation tube patch as set forth in claim 8 wherein the flexible polymer film comprises a thickness of from about 0.1778 mm to about 0.254 mm.

16. The wrap-around irrigation tube patch as set forth in claim 8 wherein the polymer film comprises an adhesive coating applied at least partially to the inner side of the polymer film.

17. The wrap-around irrigation tube patch as set forth in claim 8 wherein the polymer film comprises a sealant coating applied at least partially to the inner side of the polymer film.

18. The wrap-around irrigation patch of claim 8 wherein the flexible wrap-around irrigation patch is applied to a flexible irrigation tube and wherein the diameter of the applied flexible wrap-around irrigation patch is from 75% to 99% of the diameter of the flexible irrigation tube.

19. A method for sealing water leaks in irrigation tubing, the method comprising:
  applying a flexible wrap-around irrigation tube patch around a damaged section of flexible irrigation tubing, wherein the flexible wrap-around irrigation tube patch comprises a flexible polymer film, the flexible polymer film including at least a first longitudinal edge portion and a second longitudinal edge portion; and
  sealing the flexible wrap-around irrigation tube patch around the damaged section of flexible irrigation tubing via a slide fastener closure mechanism, wherein the closure mechanism comprises a first closure member attached to the first longitudinal edge portion of the flexible polymer film and a second closure member attached to the second longitudinal edge portion of the flexible polymer film,
  wherein the flexible polymer film is made by a process consisting essentially of film extrusion and/or film forming, and
  wherein the diameter of the applied flexible wrap-around irrigation tube patch is from 75% to 99% of the diameter of the flexible irrigation tubing.

20. The method as set forth in claim 19 wherein the diameter of the applied flexible wrap-around irrigation patch is from 75% to 95% of the diameter of the flexible irrigation tubing.

* * * * *